(12) United States Patent
Lagnado (10) Patent No.: US 9,413,411 B2
(45) Date of Patent: Aug. 9, 2016

(54) CONTROLLING TRANSMIT POWER OF AN ANTENNA BASED ON A TOUCH DISPLAY INPUT LOCATION

(71) Applicant: HEWLETT-PACKARD DEVELOPMENT COMPANY, L.P., Houston, TX (US)

(72) Inventor: Isaac Lagnado, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/770,811

(22) PCT Filed: Mar. 25, 2013

(86) PCT No.: PCT/US2013/033747
§ 371 (c)(1),
(2) Date: Nov. 12, 2015

(87) PCT Pub. No.: WO2014/158134
PCT Pub. Date: Oct. 2, 2014

(65) Prior Publication Data
US 2016/0080020 A1    Mar. 17, 2016

(51) Int. Cl.
*H04B 7/00* (2006.01)
*H04B 1/3827* (2015.01)
*G06F 1/16* (2006.01)
*G06F 1/32* (2006.01)
*H04L 12/64* (2006.01)
*H04L 12/26* (2006.01)

(52) U.S. Cl.
CPC ............ *H04B 1/3838* (2013.01); *G06F 1/1613* (2013.01); *G06F 1/3278* (2013.01); *H04L 12/6418* (2013.01); *H04L 43/16* (2013.01); *Y02B 60/126* (2013.01)

(58) Field of Classification Search
CPC ... G06F 3/0488; G06F 1/1613; G06F 3/0416; G06F 1/1626; G06F 3/0412; G06F 2203/0339; G06F 3/017
USPC ............... 455/522, 69, 68, 566, 550.1, 556.1, 455/556.2, 557.7, 90.3, 90.1, 403, 422.1, 455/73, 90.2; 345/173, 104, 169, 156, 204; 343/702, 720
See application file for complete search history.

(56) References Cited

U.S. PATENT DOCUMENTS

| | | |
|---|---|---|
| 2009/0305742 A1 | 12/2009 | Caballero |
| 2012/0162032 A1 | 6/2012 | Yang |
| 2012/0188694 A1* | 7/2012 | Sakakibara ........... G06F 1/1626 361/679.01 |
| 2012/0258772 A1 | 10/2012 | Brogle et al. |

FOREIGN PATENT DOCUMENTS

| | | |
|---|---|---|
| EP | 2214091 A2 | 8/2010 |
| EP | 2276109 | 1/2011 |
| EP | 2463956 A1 | 6/2012 |

\* cited by examiner

*Primary Examiner* — Keith Ferguson
(74) *Attorney, Agent, or Firm* — HP Inc Patent Department (57) ABSTRACT

An example provides a computing system to receive an input by a touch display of the computing system, determine a location of the touch display that received the input, and control transmit power of an antenna if the location is a back-side of the touch display.

15 Claims, 6 Drawing Sheets

CONTROLLING TRANSMIT POWER OF AN ANTENNA BASED ON A TOUCH DISPLAY INPUT LOCATION

BACKGROUND

A number of electronic devices today are capable of communicating data wirelessly. Examples of such devices may include, but are not limited to, mobile phones, smart phones, tablet computers, and notebook computers, among others. During use, devices may come into proximity or direct contact with a user, which may result in electromagnetic radiation emitted from the device being absorbed by the user's body. A measurement of such energy is specified as a specific absorption rate ("SAR").

BRIEF DESCRIPTION OF THE DRAWINGS

The detailed description section references the drawings, wherein.

DETAILED DESCRIPTION OF EMBODIMENTS

Electronic devices including, but not limited to, mobile phones, smart phones, tablet computers, and notebook computers may transmit and receive data wirelessly via an antenna. The data may include images, text, video, or other data.

Electronic devices commonly come into proximity or direct contact with a user, which may result in electromagnetic radiation emitted from the device being absorbed by the user's body. In some cases, radiation-related thresholds may exist for limiting the exposure of radiation to users. An example of a radiation-related threshold is a specific absorption rate ("SAR"), which refers to a measure of rate at which energy is absorbed by the human body when exposed to electromagnetic radiation. SAR can be expressed as power absorbed per mass of tissue.

To satisfy a radiation-related threshold, electronic devices may be configured with reduced transmission power. Reducing transmission power, however, can result in reduced communications performance of the electronic device. For example, signals having reduced transmission power can reduce the range of the transmitted signals or increase the likelihood the transmitted signals are subjected to interference from other signals, either or both of which may reduce the likelihood of successful receipt of the transmitted signals by a receiving device.

Rather than employing complete reduction of transmission power, some electronic devices may be configured to adjust the transmission power depending on the proximity of the device to the user. Devices may include, for example, specialized sensors for detecting the proximity of a user for controlling the transmission power of the device. Proximity sensors, for example, may detect a user in proximity to the antenna of the device. Orientation sensors may detect the orientation of the device, which may aid in determining the proximity of the device to the user. Context may sometimes indicate that a user is in proximity to the device. For example, a contact input across a swath of a touch display during a phone call may indicate that the device is near the user's head in which case the transmission power of the antenna may be reduced.

Described herein are embodiments of computing systems, methods, and articles of manufacture to receive an input by a touch display, determine a location of the touch display that received the input, and control transmit power of an antenna if the location is a back-side of the touch display. In various implementations, a proximity of the apparatus to a user of the computing system may be determined based on a location of the touch display that received the input, and whether a specific absorption rate is above a threshold based on the proximity of the apparatus to the user. In various implementations, using the touch display of a computing system for detecting the proximity of the computing system to a user may avoid the need for employing specialized sensors such as, for example, proximity or orientation sensors.

Figure 1:
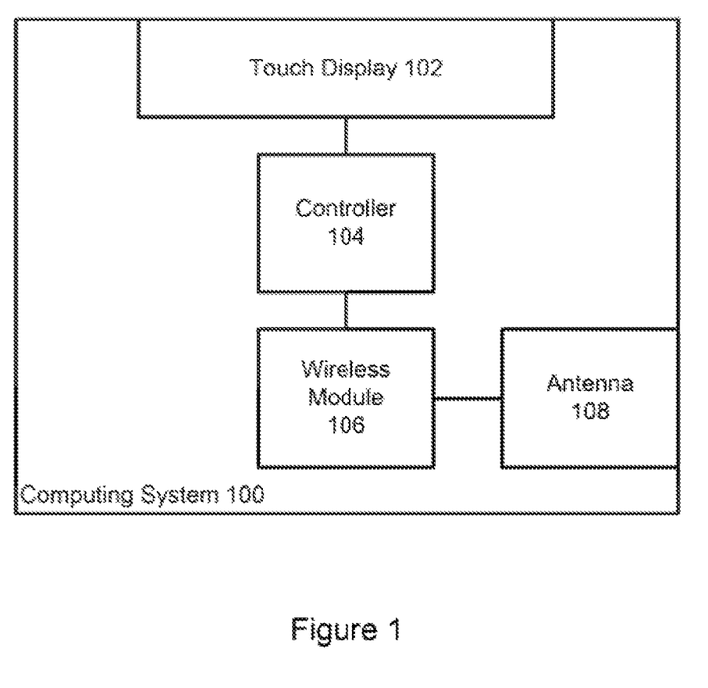
FIG. 1 is a block diagram of an example computing system in accordance with various implementations.

FIG. 1 is a block diagram of an example computing system 100 in accordance with various implementations. The computing system 100 includes a touch display 102, a controller 104, and a wireless module 106. The controller 104 may determine if an input received by the touch display 102 is an errant input or a valid input. The wireless module 106 may control a transmit power of the antenna 108 based on a type of the errant input received by the touch display 102.

In various implementations, inputs to the touch display 102 that are determined to be indirect inputs to the touch display 102 in which a user does not directly touch a front-side of the touch display 102 may be filtered as noise for enhancing the quality of the computing system's 100 response to a user's touch, but these types of inputs may be used, rather than ignored, by the controller 104 to determine a location of the computing system 100 relative to the user. Such inputs may include, for example, a user in proximity to the back-side or sidewall of the computing system 100 sensed by the touch display 102 (such as, e.g., hand, palm, or finger contact on a back-side or sidewalls of the computing system 100).

The touch display 102 may comprise any one of a number of types of touch display panels to receive touch inputs. Examples may include, but are not limited to, liquid crystal displays, light emitting diode displays, organic light emitting diode displays, or active-matrix organic light emitting diode displays.

In various implementations, the touch display 102 may be a capacitive touch screen display panel or another type of touch screen display panel configured to detect inputs at a back-side or sidewall of the touch display 102. A capacitive touch screen of a device may detect contacts by a user to locations of the device other than directly to a front-side of the touch screen itself, but ordinarily these contacts may be filtered as noise or stray capacitive based on the level of intensity of the contact detection. In various implementations described herein, the touch display 102 may be used, rather than ignored, by the controller 104 to determine a location of the computing system 100 relative to the user. In various implementations, a resolution and sensitivity of a touch display 102 may be adjusted to capture inputs to a back-side and/or sidewall of the computing system 100. For example, the touch display 102 may be configured with a lower resolution yet increased sensitivity as compared to a touch display of a computing system incapable of determining a location of the touch display 102 receiving the and controlling a transmission power of an antenna if the input is received at a back-side or sidewall of the touch display 102.

The computing system 100 may be a stand-alone device or may be incorporated into any apparatus or system. Examples of computing systems may include, but are not limited to, desktop computers, notebook computers, handheld computers, tablet computers, netbook computers, convertible computers, display devices, servers, set-top boxes, digital recorders, game consoles, smart phones, personal digital assistants, mobile phones, digital media players, televisions, or digital cameras.

In various implementations, the controller 104 may be a processor configured to access instructions stored on a nontransitory computer-readable medium, an application specific integrated circuit ("ASIC"), a programmable logic device, or another component configured to control at least one other component. In some implementations, the controller 104 may be a display controller. In some implementations, the controller 104 may be integrated into the wireless module 106.

In various examples, the controller 104 is to determine whether a SAR exceeds a threshold for the proximity of the computing system 100 relative to the user. In various implementations, the threshold may be an upper limit determined by, for example, a government agency. A threshold when the computing system is near a user's head, for example, may be a first value, while a threshold when the computing system is away from the user's head and near a user's extremity or torso, for example, may be a second value, typically a value larger than the first value. In response to determining that the SAR is above a threshold, the controller 104 may instruct the wireless module 106 to control the transmit power of the antenna 108 to reduce the overall SAR.

Figure 2:
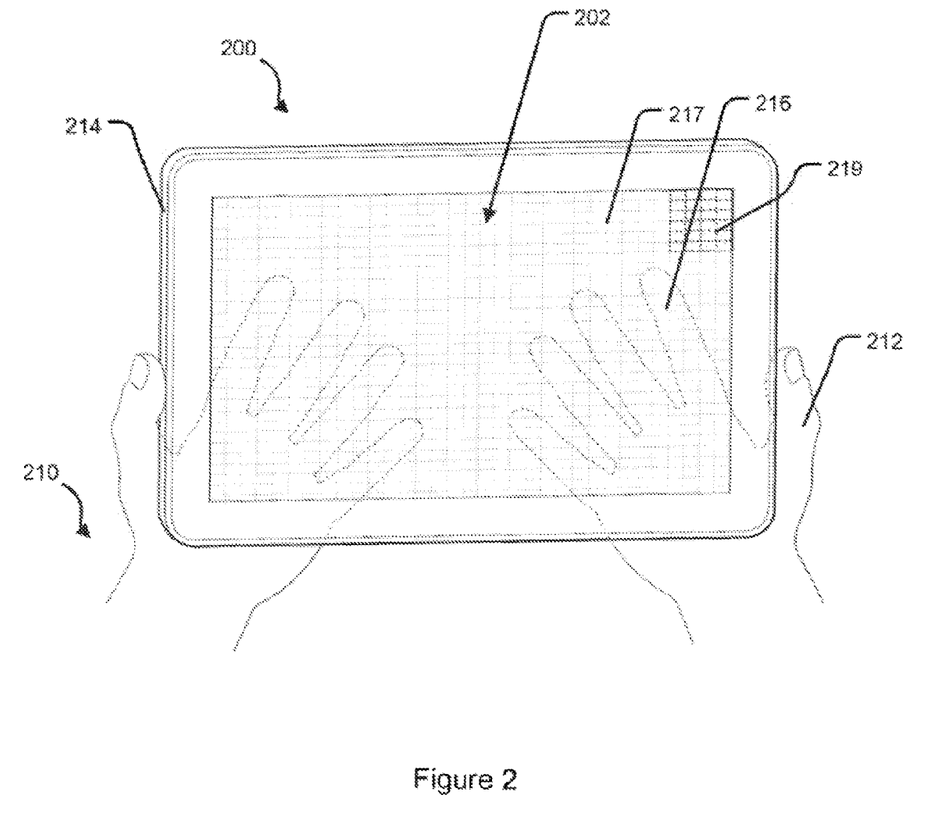
FIG. 2 depicts a user interacting with another example computing system in accordance with various implementations.

As shown in FIG. 2, a user 210 may interact with an example computing system 200 in accordance with various implementations. As shown, the user 210 is holding the computing system 200 such that the users thumbs 212 contact the sidewalls 214 of the computing system 200, fingers 216 of one hand contact a portion of the back-side (not explicitly shown here) of the computing system 200, and fingers 216 of another one of the hands contact another portion of the back-side of the computing system 200. In this context, the computing system 200 may determine a proximity of the computing system 200 to the user 210 is such that the computing system 200 is being held away from the user 210 in a reading position and probably not near the user's head.

For determining the manner in which the user is handling the system 200, the computing system 200 may user additional information associated with the contacts to the computing system 200 so as to obtain a "virtual image" of the touch contacts to differentiate between a user's hand and another body part (torso or head, for example). In some implementations, for instance, a controller of the computing system 200 may determine a location of the touch display 202 at which a contact (e.g., an errant input) is detected. For example, the touch display 202 may include wires, a series of row and column electrodes forming a grid 217, or another manner in which to extrapolate a location at which an input is detected.

For the example computing system 200 of FIG. 1, an input may have associated location coordinates of the grid 217 associated with the touch display 202. The location coordinates may comprise, for example, an X coordinate and a Y coordinate of the grid 217 for a contact to the back-side of the computing system 200, a coordinate on a particular one of the sidewalls of the computing system 200, etc. In this example, the plurality of inputs, each with associated coordinates, may provide an indication of the type of errant input—i.e., the user's thumbs 212 in contact the sidewalls 214 of the computing system 200, fingers 216 of one hand in contact a portion of the back-side of the computing system 20, and fingers 216 of another one of the hands in contact another portion of the back-side of the computing system 200.

In various implementations, inputs received at a predetermined area 219 of the touch display 202, via the back-side of the computing system 200, may trigger the controlling of the transmission power of an antenna by a wireless module of the computing system 200. In various ones of these implementations, the area 219 may be an area near the antenna of the computing system 200. In some implementations, the controller may proceed with determining a "virtual image" from inputs while reduction or other controlling of the transmission power of the antenna by the wireless module may be triggered by an input to the area 219. In some examples, an input received outside of the area 219 may be ignored by the controller or the controller may wait for additional input before taking action on inputs received outside of the area 219.

Figure 3:
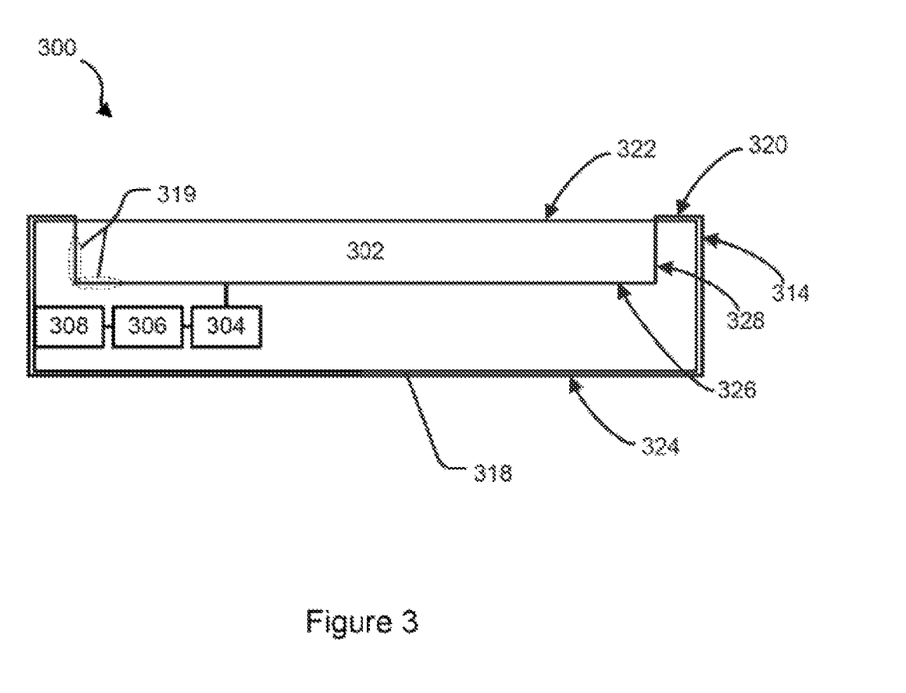
FIG. 3 is a sectional diagram of another example computing system in accordance with various implementations.

FIG. 3 is a diagram of another computing system 300 in accordance with various implementations. The computing system 300 may comprise a housing 318 that houses a touch display 302 to receive an input, a controller 304 to determine a location of the touch display that received the input, and a wireless module 306 to control a transmit power of the antenna 308 if the input was received by a back-side of the touch display 302. The housing 318 may include a front-side 320 having an opening exposing a front-side 322 of the touch display 302, and a sidewall 314 separating a back-side 324 of the computing system 300 from the front-side 320 of the computing system 300.

In various implementations, a location of the touch display receiving the input may indicate a proximity of the computing system 300 to a user. For some examples, the controller 306 may determine a location or proximity of the computing system 300 relative to the user based a receipt location of the input, and in some implementations, may determine whether to adjust the transmission power of the antenna 308 based on the location of the touch display at which the input was received. The wireless module 306 may determine whether a SAR is above a predetermined threshold based on the proximity of the computing system 300 to the user as determined by the location of the touch display at which the input was received. The wireless module 306 may adjust the transmit power of the antenna 308 if the SAR is above the threshold.

In various implementations, if the controller 304 determines, by virtual imaging as described herein, for example, that the inputs received by the touch display 302 are inputs received from a back-side 326 of the touch display 302 due to a touch by a user to the back-side 324 of the computing system 100, this may indicate that the user is holding the computing system 300 with two hands, for example. In this example, the controller 302 may determine that the computing system 300 is located away from the user's head.

In another example, if the controller 304 determines that inputs received by the touch display 302 are inputs received from a back-side 326 of the touch display 302 due to a touch to the back-side 324 of the computing system 300, indicating that a user is holding the computing system 300 with a palm of a hand, for example, the controller 302 may determine that the computing system 300 is also located away from the user's head.

In yet another example, if the controller 304 determines that inputs received by the touch display 302 are inputs received from a sidewall 328 of the touch display 302 due to a touch to the sidewall 314 of the computing system 300 and not the back-side 324, this may indicate that a user is possibly holding the computing system 300 near the user's head (e.g., when using the computing system 300 as a phone). In this example, the controller 304 may determine the proximity of the computing system 300 to the user based on the type of the errant input (e.g., contacts to the sidewall 314 of the computing system 300) in combination with information regarding the current active application of the computing system 300. For example, if the controller 304 determines that inputs received by the touch display 302 are inputs received from a sidewall 314 of the computing system 300 and not the back-side 324, and that the current active application indicates that the user is on a phone call, this may indicate that a user is probably holding the computing system 300 near the user's head.

In various examples, if the controller 304 determines that the inputs received by the touch display 302 are inputs received at a predetermined area, such as, for example, area 319, of a back-side 326 or sidewall 328 of the touch display 302, this may trigger the wireless module 306 to control the transmit power of the antenna 308 or the controller 304 to cause the wireless module 306 to control the transmit power of the antenna 308. For example, the area 318 may be a back-side 326 or sidewall 328 of the touch display 302 near the antenna 308. In various ones of these implementations, the controller 304 may determine the types of inputs for virtual imaging, with or without triggering transmit power control by inputs at the area 319.

In various implementations, the controller 304 may determine whether an input was received at the front-side 322 of the touch display 302. In some implementations, the controller 304 may perform a filtering operation on an input received at a front-side 322 of the touch display 302 to determine whether the input should be ignored as a false touch not intended by the user as input or as a true touch intended by the user as input. For example, an input on the front-side 322 of the touch display 302 that may be ignored could be a shadow of the user's hand, a palm touch, a stray finger, etc.

In various implementations, the controller 304 may determine whether an input is an input that was received on the back-side or sidewall of the touch display 302 based on a predetermined intensity threshold. For example, a controller 304 may determine an intensity of an input in terms of capacitance, voltage, or other unit, depending on the type of touch display, and determine whether the input is a back-side or sidewall input based on the intensity of the input relative to the predetermined threshold. For some implementations, the touch display 302 may determine that an input is an input received on a front-side 322 of the touch display 302 if the input has an intensity exceeding a threshold value or that the input is an input received on the back-side 326 or sidewall 328 of the touch display 302 if the intensity of the input is below the threshold value.

Inputs received from various locations of the apparatus 300 may describe an "image" of the touch contact, which may provide further information on the location of the computing system 300 at which the input was received. In various ones of these implementations, the controller 304 may determine the locations at which the inputs were received, and use the locations as virtual imaging for differentiating between a user's hand and another body part (torso or head, for example). For example, an input may have associated intensity values indicating a back-side or sidewall contact and coordinates (such as, e.g., an X coordinate and a Y coordinate on the back of the apparatus 300) indicating a location of the contact. In this example, a plurality of inputs, each with associated coordinates, may provide an indication of the location at which the input was received. For example, a plurality of inputs may have coordinates representative of a finger, multiple fingers, a point contact, etc.

Figure 4:
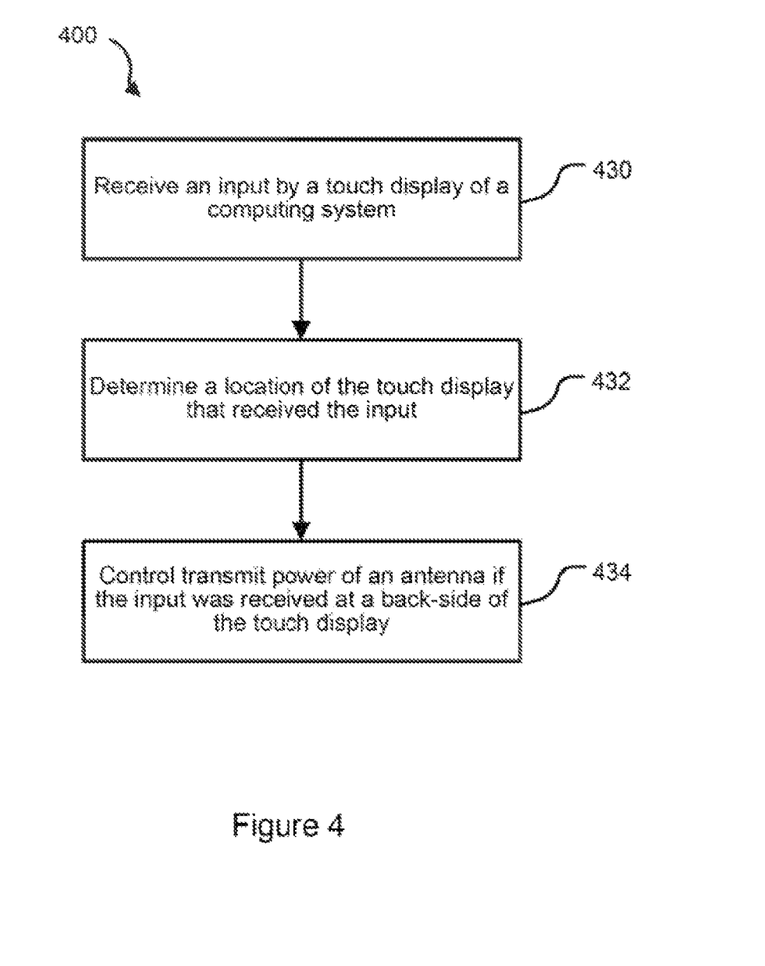
FIG. 4 is a flow diagram of an example method in accordance with various implementations.
Figure 5:
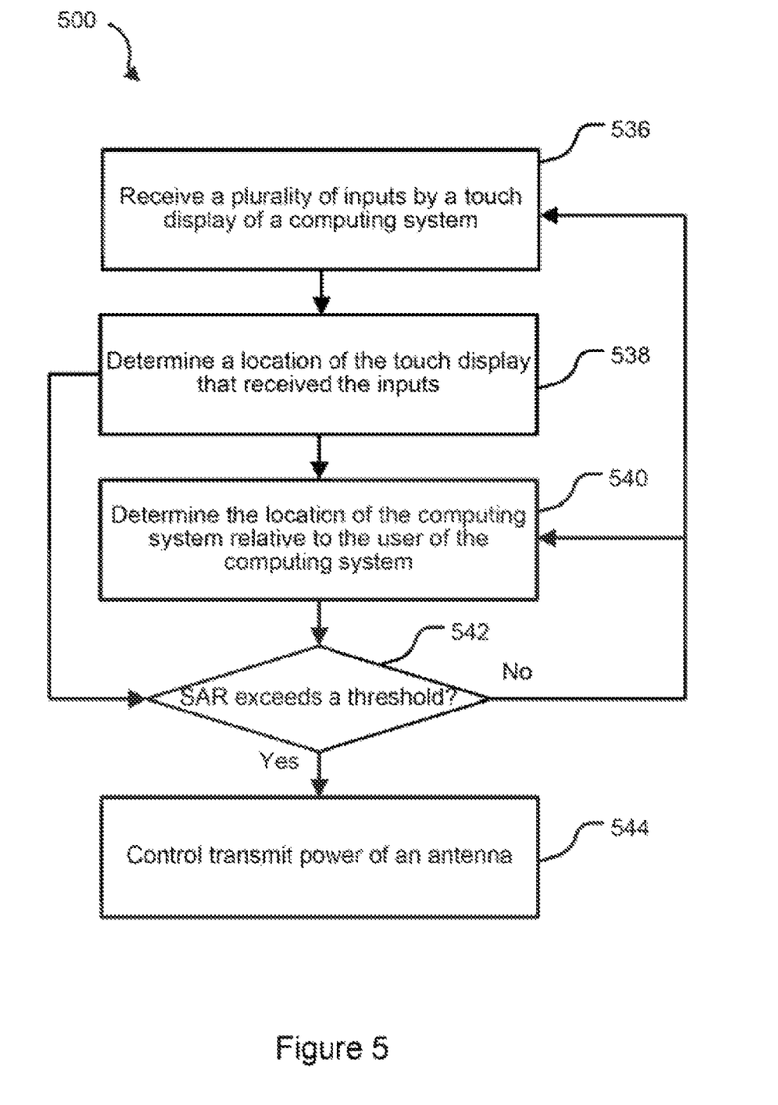
FIG. 5 is a flow diagram of another example method in accordance with various implementations.

FIG. 4 and FIG. 5 are flow diagrams depicting example methods 400 and 500, respectively, for controlling a transmit power of an antenna of a computing system based on an errant input, in accordance with the various embodiments described herein. While the flow diagrams illustrate various operations in a particular order, the drawings are not intended to limit the present disclosure to any particular order. Additionally, the drawings are not intended to imply that all operations are required for all implementations.

Referring to FIG. 4, processing for the method 400 may begin or proceed to block 430 by receiving an input by a touch display of a computing system. The computing system may comprise a computing system such as any of the computing systems described herein with reference to FIGS. 1-3. The method 400 may proceed with determining a location of the touch display that received the input at block 432. In various examples, a controller of the computing system may determine if the input is an input received at a front-side, back-side, or sidewall of the touch display. The method 400 may proceed to block 434 by controlling the transmit power of an antenna if the input was received at a back-side of the touch display, in various examples, the method 400 may include controlling the transmit power of an antenna if the input was received at a sidewall of the touch display In various examples, a wireless module of the computing system may control the transmit power of an antenna of the computing system.

Referring now to FIG. 5, processing for the method 500 may begin or proceed to block 536 by receiving inputs by a touch display of a computing system. The computing system may comprise a computing system such as any of the computing systems described herein with reference to FIGS. 1-3.

The method 500 may proceed to block 538 with determining a location of the computing system relative to a user based on the inputs. In various examples, said determining may include determining whether the input was received on a front-side of the touch display or a back-side or sidewall of the touch display. In various implementations, determining whether the input was received on the front-side, back-side, or sidewall of the computing system may comprise determining an intensity of an input, and determining that the input is an input on a front-side of the touch display if the intensity of the input exceeds a threshold value or that the input is an input on the back-side or a sidewall of the touch display if the intensity of the input is below the threshold value. As described herein with respect to various implementations, inputs may be, for example, The method 500 may proceed to block 540 by determining a location of the computing system relative to the user based on the inputs. As described herein, for example, inputs received from a back-side of the touch display via the back-side of the computing system may indicate that a user is holding the computing system with two hands and therefore that the computing system may be located away from the user's head. In another example, inputs received from a back-side of the touch display via the back-side of the computing system may indicate that a user is holding the computing system with a palm of a hand and therefore that the computing system may be located away from the user's head. In yet another example, inputs received from a sidewall of the touch display via the sidewall of the computing system and not the back-side of the computing system may indicate that a user is possibly holding the computing system near the user's head (e.g., when on a phone call). In various implementations, the input may be a contact by the user to an area of the computing system near the antenna.

In various examples, determining the location of the computing system relative to the user may be based further on an input received at a front-side of the touch display. For example, an input such as a hand contact to a back-side of the computing system in combination with an input such as a finger contact to a front-side of the touch display may indicate that the user is holding the computing system with one hand while providing a true touch input to the touch display (e.g., for browsing, typing, etc.). In still further implementations, a controller of the computing system may determine the location of the computing system relative to the user based on an input to a back-side or sidewall of a touch display in combination with information regarding the current active application of the computing system, and sometimes, in further combination with an input to a front-side of the touch display. For example, if the controller determines that inputs received by the touch display are inputs received from a sidewall of the computing system and not the back-side of the computing system, and that the current active application indicates that the user is on a phone call, this may indicate that a user is probably holding the computing system near the user's head.

The method 500 may proceed to block 542 by determining if a SAR exceeds a threshold for the location of the computing system relative to the user. In various implementations, the threshold may be an upper limit determined by, for example, a government agency. A threshold when the computing system is near a user's head, for example, may be a first value, while a threshold when the computing system is away from the user's head and near a user's extremity, for example, may be a second value, typically a value larger than the first value. If it is determined that the SAR does not exceed the threshold for the location of the computing system relative to the user, the method 500 may proceed back to block 536.

If, on the other hand, it is determined that the SAR exceeds the threshold for the location of the computing system relative to the user, the method 500 may proceed to block 544 by controlling the transmission power of the antenna. In some examples, the transmit power of the antenna may be adjusted to conform to SAR thresholds. For example, if it is determined the computing system is near the user's head and the SAR is greater than a threshold for use of the computing system near the user's head, the transmit power of the antenna may be reduced to conform to the SAR threshold. In another example, if it is determined that the user has contacted an area near the antenna and that the SAR is greater than a threshold for use of the antenna near the user, the transmit power of the antenna may be reduced to conform to the SAR threshold. In yet another example, if it is determined that the SAR is less than an allowable SAR threshold for the location of the computing system, the transmit power may be increased. In the latter example, increasing the transmit power may provide increased communications performance of the computing system As described earlier, in various implementations, the location of the contact may be determined at block 538 to be in an area, such as an area near an antenna of the computing system. In some of these implementations, the method 500 may proceed directly to block 542 by determining if a SAR exceeds a threshold for contact by a user to the area near the antenna. If it is determined that the SAR does not exceed the threshold for contact by a user to the area near the antenna, the method 500 may proceed back to block 536. If, on the other hand, it is determined that the SAR does exceed the threshold for contact by a user to the area near the antenna, the method 500 may proceed to block 544 by controlling the transmission power of the antenna or to block 540 by determining the location of the computing system relative to the user of the computing system.

Figure 6:
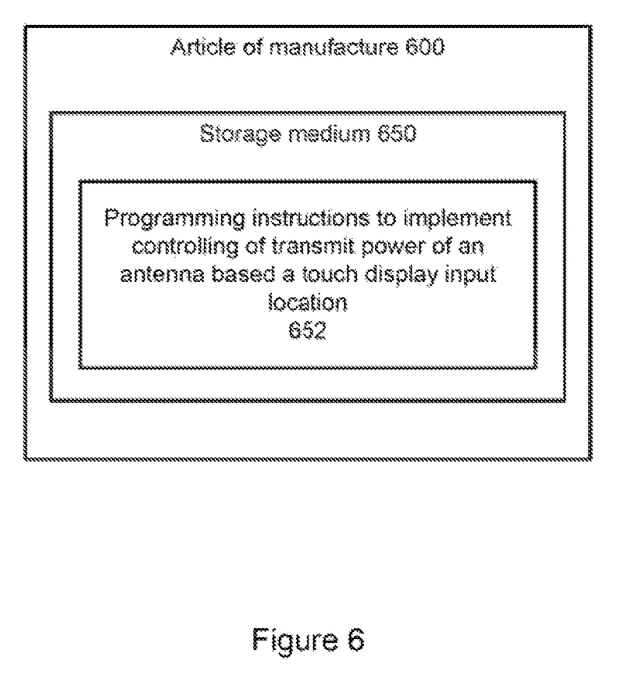
FIG. 6 is a block diagram of an example article of manufacture in accordance with various implementations.

In various embodiments, an article of manufacture may be employed to implement one or more methods as disclosed herein. FIG. 6 is a block diagram of an example article of manufacture 600. As shown, the article of manufacture 600 may include a computer-readable non-transitory storage medium 650. The storage medium 650 may represent a broad range of persistent storage medium known in the art, including but not limited to flash memory, optical disks or magnetic disks.

The storage medium 650 may include programming instructions 652 to cause a computing system to practice some or all aspects of controlling a transmit power of an antenna based on a touch display input location, in accordance with embodiments of the present disclosure. In particular, the programming instructions 650 may enable a computing system, in response to their execution by the computing system, to practice some or all aspects of the methods of FIG. 4 and/or FIG. 5, for example, in accordance with embodiments of the present disclosure.

Various aspects of the illustrative embodiments are described herein using terms commonly employed by those skilled in the art to convey the substance of their work to others skilled in the art. It will be apparent to those skilled in the art that alternate embodiments may be practiced with only some of the described aspects. For purposes of explanation, specific numbers, materials, and configurations are set forth in order to provide a thorough understanding of the illustrative embodiments. It will be apparent to one skilled in the art that alternate embodiments may be practiced without the specific details. In other instances, well-known features are omitted or simplified in order not to obscure the illustrative embodiments.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of this disclosure. Those with skill in the art will readily appreciate that embodiments may be implemented in a wide variety of ways. This application is intended to cover any adaptations or variations of the embodiments discussed herein. It is manifestly intended, therefore, that embodiments be limited only by the claims and the equivalents thereof.

What is claimed is:

1. A computing system comprising:
   a touch display to receive an input;
   a controller to determine a location of the touch display that received the input; and
   a wireless module to control a transmit power of an antenna if the location is a back-side of the touch display.

2. The computing system of claim 1, wherein the touch display is a capacitive touch display.

3. The computing system of claim 1, wherein the controller is to determine that the input is an errant input if the input was received at the back-side of the touch display or a valid input if the input is received at a front-side of the touch display.

4. The computing system of claim 3, wherein the controller is to determine that the input is on a front-side of the touch display if the input has an intensity exceeding a threshold value or that the input is on the back-side of the touch display if the intensity of the input is below the threshold value.

5. The computing system of claim 1, wherein the controller is determine a proximity of the apparatus to a user of the computing system based on the location of the touch display that received the input, and whether a specific absorption rate is above a threshold based on the proximity of the apparatus to the user.

6. The computing system of claim 1, wherein the controller is to determine from a plurality of inputs a body part of a user providing the plurality of inputs.

7. The computing system of claim 6, wherein the controller is to determine whether a specific absorption rate is above a threshold based on the body part of the user providing the plurality of inputs.

8. The computing system of claim 1, wherein the controller is to determine if the input is a contact by the user to an area of the back-side of the touch display near the antenna and whether a specific absorption rate is above a threshold based on the contact by the user to the area.

9. The computing system of claim 1, wherein the computing system is a selected one of a desktop computer, a laptop computer, a handheld computer, a tablet computer, a netbook computer, a convertible computer, a display device, a server, a set-top box, a digital recorder, a game console, a smart phone, a personal digital assistant, a mobile phone, a digital media player, a television, or a digital camera.

10. A method comprising:
receiving an input by a touch display of a computing system;
determining a location of the touch display that received the input; and
controlling transmit power of an antenna if the location is a back-side of the touch display.

11. The method of claim 10, wherein the determining comprises determining an intensity of the input, and determining that the input is an input on a front-side of the touch display if the intensity of the input exceeds a threshold value or that the input is an input on the back-side or a sidewall of the touch display if the intensity of the input is below the threshold value.

12. The method of claim 10, further comprising:
receiving a plurality of other inputs by the touch display;
determining a location of the computing system relative to the user based on the input and the plurality of other inputs; and
controlling the transmit power of the antenna if the input and the plurality of other inputs indicate a contact by a body part of the user to a back-side or a sidewall of the computing system.

13. The method of claim 12, wherein the determining the location of the computing system relative to the user comprises determining the location of the computing system relative to the user based further on an input received on a front-side of the touch display.

14. The method of claim 12, further comprising determining if a specific absorption rate exceeds a threshold for the location of the user relative to the computing system, and reducing the transmit power of the antenna if the specific absorption rate is above the threshold.

15. An article of manufacture comprising:
a computer-readable non-transitory storage medium; and
a plurality of programming instructions stored in the storage medium to cause a computing system, in response to execution of the programming instructions by the computing system, to perform a plurality of operations including:
receiving an input;
determining a location of a touch display that received the input; and
controlling transmit power of an antenna if the location is a back-side of the touch display.

* * * * *